United States Patent
Reinauer

(10) Patent No.: US 8,424,879 B2
(45) Date of Patent: Apr. 23, 2013

(54) CONNECTION BETWEEN TWO TOOL PARTS

(75) Inventor: Andreas Reinauer, Krauchenwies (DE)

(73) Assignee: Mapal Fabrik fur Prazisionswerkzeuge Dr. Kress KG, Aalen (DE)

( * ) Notice: Subject to any disclaimer, the term of this patent is extended or adjusted under 35 U.S.C. 154(b) by 1251 days.

(21) Appl. No.: 11/920,781

(22) PCT Filed: May 25, 2006

(86) PCT No.: PCT/EP2006/005010
§ 371 (c)(1),
(2), (4) Date: Mar. 17, 2008

(87) PCT Pub. No.: WO2006/125653
PCT Pub. Date: Nov. 30, 2006

(65) Prior Publication Data
US 2009/0045593 A1    Feb. 19, 2009

(30) Foreign Application Priority Data

| | | |
|---|---|---|
| May 25, 2005 | (DE) | 20 2005 008 389 U |
| May 27, 2005 | (DE) | 20 2005 008 461 U |
| Aug. 27, 2005 | (DE) | 20 2005 013 572 U |
| Oct. 15, 2005 | (DE) | 10 2005 049 615 |

(51) Int. Cl.
*B23B 31/107* (2006.01)
(52) U.S. Cl.
USPC .................. 279/30; 279/29; 279/76; 279/137; 279/906

(58) Field of Classification Search .............. 279/28–30, 279/74, 76, 82, 137, 906; *B23B 31/107*
See application file for complete search history.

(56) References Cited

U.S. PATENT DOCUMENTS

| | | | | | |
|---|---|---|---|---|---|
| 2,136,190 | A | * | 11/1938 | Gulfelt | 279/76 |
| 2,612,377 | A | * | 9/1952 | Edens | 279/22 |
| 3,085,812 | A | * | 4/1963 | Rosenthal et al. | 279/4.06 |
| 3,622,169 | A | | 11/1971 | Koch et al. | |
| 3,698,748 | A | * | 10/1972 | Petri | 403/328 |
| 3,975,032 | A | * | 8/1976 | Bent et al. | 279/30 |
| 4,057,260 | A | * | 11/1977 | Sigott | 279/77 |
| 4,442,601 | A | * | 4/1984 | Hirsch et al. | 30/169 |

(Continued)

FOREIGN PATENT DOCUMENTS

| | | |
|---|---|---|
| DE | 299 22 642 U1 | 3/2000 |
| DE | 101 59 611 C1 | 5/2003 |

(Continued)

OTHER PUBLICATIONS

Japanese Office Action for parallel Japanese application JP 2008-512774, and English translation thereof.

(Continued)

*Primary Examiner* — Eric A Gates
(74) *Attorney, Agent, or Firm* — Harness, Dickey & Pierce, P.L.C.

(57) ABSTRACT

A connection connecting two tool parts includes a first tool part and a receptacle for receiving a second tool part. A clamping device clamps the tool parts together in a joined state. The connecting point further includes a retaining device that is independent of the clamping device and holds the tool parts together in the joined state.

29 Claims, 5 Drawing Sheets

U.S. PATENT DOCUMENTS

| | | | | |
|---|---|---|---|---|
| 4,775,160 A | * | 10/1988 | Manschitz | 279/74 |
| 4,786,221 A | * | 11/1988 | March | 409/218 |
| 5,464,229 A | * | 11/1995 | Salpaka | 279/30 |
| 5,904,456 A | * | 5/1999 | Chern | 408/240 |
| 6,398,465 B1 | * | 6/2002 | Monge | 408/1 R |
| 6,419,430 B2 | | 7/2002 | Hangleiter | |
| 6,533,291 B2 | * | 3/2003 | Huggins et al. | 279/29 |
| 6,554,292 B1 | * | 4/2003 | Rohm | 279/137 |
| 6,688,610 B2 | * | 2/2004 | Huggins et al. | 279/22 |
| 6,722,668 B2 | * | 4/2004 | Huggins et al. | 279/29 |
| 6,776,553 B2 | | 8/2004 | Kress | |
| 6,808,182 B2 | * | 10/2004 | Lin | 279/74 |
| 6,851,678 B2 | * | 2/2005 | Mack | 279/62 |
| 6,905,278 B2 | | 6/2005 | Kress | |
| 6,923,605 B2 | | 8/2005 | Jakob et al. | |
| 7,195,431 B2 | | 3/2007 | Greif et al. | |
| 7,584,971 B2 | * | 9/2009 | Weller | 279/93 |
| 2001/0006280 A1 | | 7/2001 | Hangleiter | |
| 2003/0075880 A1 | * | 4/2003 | Girardeau | 279/137 |

FOREIGN PATENT DOCUMENTS

| | | |
|---|---|---|
| DE | 102 59 989 A1 | 7/2004 |
| DE | 20 2004 00950 U1 | 8/2004 |
| DE | 103 42 951 B3 | 4/2005 |
| EP | 0901859 A | 3/1999 |
| JP | 60-259208 A | 12/1985 |
| JP | 6-36506 U | 5/1994 |
| JP | 11-285909 | 10/1999 |
| JP | 11-347890 | 12/1999 |

OTHER PUBLICATIONS

German Search Report for DE 20 2005 013 572.0, dated Dec. 6, 2007.
Japanese Office Action (Final Rejection mailed Nov. 15, 2011) for parallel Japanese application JP 2008-512774, and English translation thereof.

* cited by examiner

CONNECTION BETWEEN TWO TOOL PARTS

CROSS-REFERENCE TO RELATED APPLICATIONS

This application is a 371 National Stage of International application No. PCT/EP2006/005010, filed May 25, 2006. This application claims the benefit of DE 20 2005 008 389.5, filed May 25, 2005, DE 20 2005 008 461.1, filed May 27, 2005, DE 20 2005 013 572.0, filed Aug. 27, 2005, and DE 10 2005 049 615.6, filed Oct. 15, 2005. The disclosures of the above applications are incorporated herein by reference.

FIELD

The invention relates to a connection for connecting two tool parts.

BACKGROUND

Connecting points of this type are known, and are used to join two tool parts to one another. The connecting point may be provided directly on one machine tool, so that a tool part is formed by the receiving spindle of the machine tool. However, this tool part may also be formed by a spacer element, adapter, or portion of a tool. The other tool part may be a tool holder, spacer element, adapter, or the like. Overall, in the present case the term "tool part" refers to elements of various designs which are joined to one another in the region of a connecting point. It is known that the tool parts of a connecting point are clamped together. This is achieved by means of a clamping device which may be actuated by manual or mechanical means, or also automatically. It has been shown that when two tool parts are joined in the region of a connecting point, immediately after the tool parts are joined there is a risk that the two tool parts may come apart before the clamping device is actuated. This may result in damage to the tool and/or the machine tool, as well as injury to the operator. In particular when the two tool parts associated with a connecting point are clamped together manually, the problem frequently arises that the operator must insert one tool part with both hands into the other tool part of the connecting point, and then has difficulty actuating a manual clamping device while securing or holding himself stationary.

SUMMARY

The object of the invention, therefore, is to provide a connecting point comprising two tool parts which avoids injury to the operator and also prevents damage to one or both tool parts of a connecting point.

The connecting point is characterized in that a retaining device is provided which, after the joining, holds the tool parts together in the region of a connecting point, independently of the actuation of a clamping device associated with the connecting point. After being joined, the two tool parts are thus held against one another by the retaining device, even if the clamping device has not yet been actuated. In this manner an operator can manually join two tool parts, and then, without the tool parts being able to come apart, can also actuate a manual clamping device in order to securely clamp the tool parts together in the region of the connecting point.

One particularly preferred exemplary embodiment of the connecting point is characterized in that the retaining device is automatically actuated when the two tool parts are joined in the region of a connecting point. Thus, there is no need for additional handling steps to actuate the retaining device. When the two tool parts are joined, in a manner of speaking they are automatically held together by the retaining device, so that the operator has both hands free in order to secure himself and also actuate the clamping device.

Further embodiments result from the subclaims.

DRAWINGS

The invention is explained in greater detail below with reference to the drawings, which show the following:

DETAILED DESCRIPTION

Figure 1:
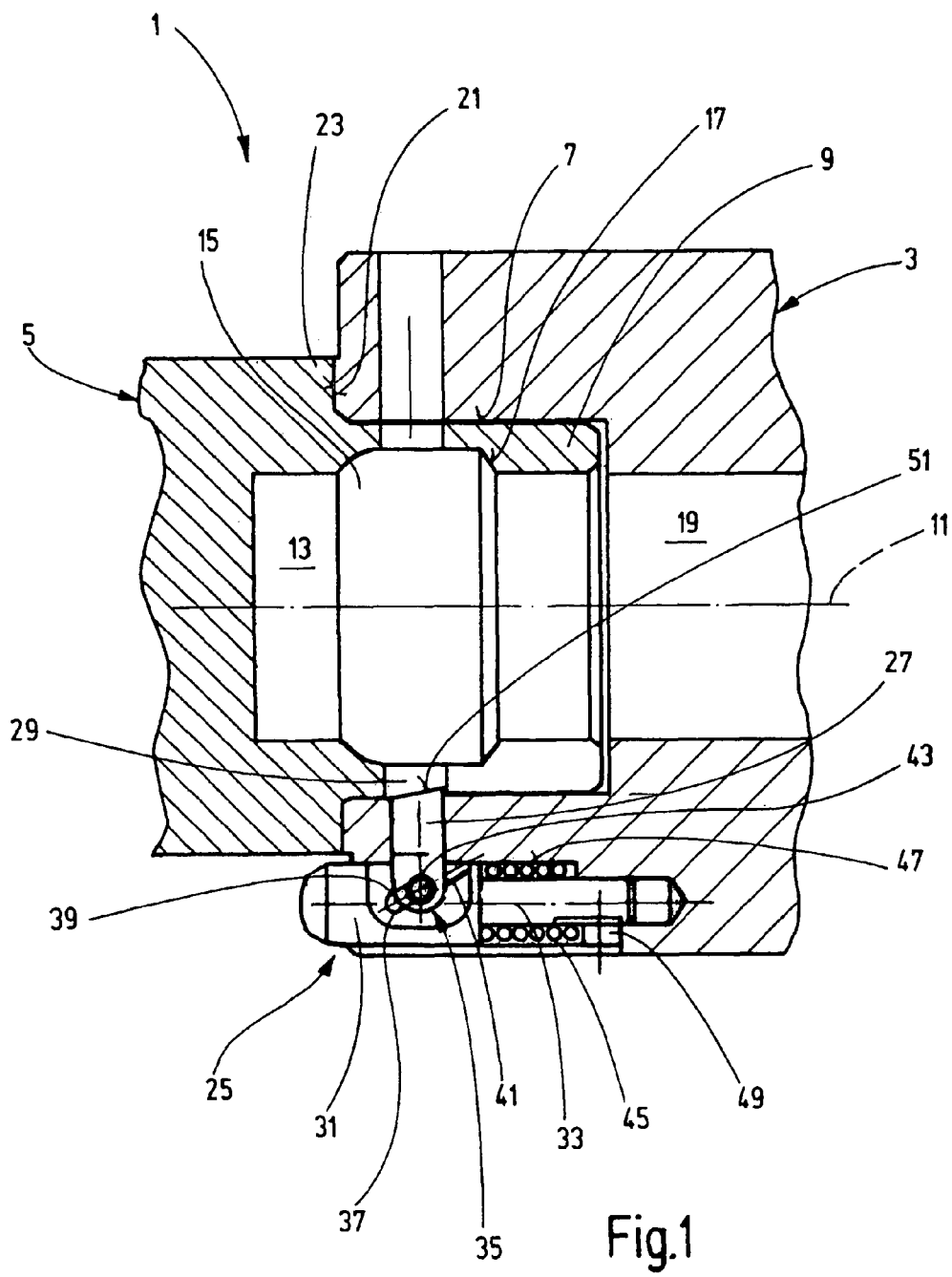
FIG. 1 shows a first exemplary embodiment of a connecting point in the longitudinal section.

FIG. 1 shows a first exemplary embodiment of a connecting point 1 in the longitudinal section. The connecting point comprises a first tool part 3, illustrated here in truncated form, which forms a receptacle in which a second tool part 5 is inserted in places. To this end, the first tool part has a recess 7 in which a section of the second tool part 5, also referred to as a shaft 9, is inserted.

The recess 7 may have a cylindrical, polygonal, or also a conical shape, as illustrated in FIG. 1. The recess expands in the direction of the second tool part 5, the shaft 9 of which has a corresponding conical shape. When the two tool parts 3 and 5 of the connecting point 1 are inserted one inside the other, they are concentric to the center axis 11 of the connecting point 1, which thus also forms the center axis of the first tool part 3 and the second tool part 5.

In the exemplary embodiment illustrated here, the shaft 9 of the second tool part 5 has a hollow design, the cavity 13 of the shaft 9 having a circumferential groove 15 with a clamping shoulder 17. Clamping elements (not illustrated here) engage in the groove, and in the clamped state rest against the clamping shoulder and brace the first tool part 3 against the second tool part 5. The clamping elements may be externally actuated through openings extending perpendicular to the center axis 11, or through a central opening 19 in the first tool part 3.

In the exemplary embodiment illustrated here it is seen that the two tool parts 3 and 5 contact one another in the region of the connecting point 1, and preferably have annular surfaces 21 and 23 which are situated concentrically with respect to the center axis 11 and which lie in a plane perpendicular to the center axis 11. The annular surface 21 is associated with the first tool part, and the annular surface 23 is associated with the second tool part 5.

This design of the connecting point 1 is basically known, and therefore is not discussed in greater detail here.

The connecting point 1 illustrated here is characterized by a retaining device 25 which holds the two tool parts 3 and 5 of the connecting point 1 together in the joined state, even when the clamping device (not illustrated here) has not yet been actuated.

For this purpose the retaining device has at least one locking element 27 which is displaceably supported in one of the tool parts, in this case the first tool part 3, and in a functional position, namely, the locked position illustrated here, engages in the other tool part, in this case the second tool part 5, when the tool parts 3 and 5 are joined together. In this manner, as described above, the two tool parts 3 and 5 are held together after being joined.

In the exemplary embodiment illustrated here, in the locked position the locking element 27 projects slightly into the recess 7 and engages in a recess 29 provided in the other tool part, in this case the second tool part 5. Viewed in the direction of the center axis 11, this recess is situated such that the locking element 27 with its right (as shown in FIG. 1) outer surface rests against the right inner surface of the recess 29, so that the second tool part 5 cannot fall out of the first tool part 3 after the two tool parts 3 and 5 have been joined in the region of the connecting point 1.

In the exemplary embodiment illustrated here, the second tool part 5 is designed in such a way that the recess 29 is formed by a hole, preferably a borehole, extending essentially perpendicular to the center axis 11. However, individual depressions in the outer surface of the second tool part, and thus support surfaces for the locking element 27, may also be provided on the second tool part 5, or a circumferential groove may be provided in the exterior of the shaft 9 in which the locking element 27 is able to engage in the joined state of the tool parts 3 and 5. In the latter case, the rotational position of the two tool parts 3 and 5 is irrelevant when they are joined, because the locking element 27 is always able to engage in the annular groove. As illustrated here, when a recess 29 designed as a borehole is provided in the second tool part 5, a specified rotational alignment of the two tool parts 3 and 5 with respect to one another is required in the region of the connecting point 1 to ensure that the locking element 27 is able to engage in the recess 29.

In the exemplary embodiment illustrated in FIG. 1, the locking element 27 is guided in a borehole extending essentially perpendicular to the center axis 11. This borehole may also extend at an angle relative to the center axis 11. It is crucial that the locking element 27 in its locked position engages in a recess 29, thus holding the second tool part 5 in a predetermined position as viewed in the direction of the center axis 11.

In the exemplary embodiment illustrated here, the retaining device 25 is situated in the front region of the first tool part 3, i.e., close to the annular surface 21. The locking element 27 thus engages in the recess 7 and is able to grip the second tool part 5 in the region of the shaft 9 thereof. The locking element 27 is thus situated inside the connecting point 1 and is therefore protected from contaminants.

The locking element 27 cooperates with an actuating element 31 of the retaining device 25. The actuating element is displaceably supported in the tool part in which the locking element 27 is provided, i.e., in the first tool part 3 in this case. In the exemplary embodiment illustrated here, the center axis 33 and thus also the displacement path of the actuating element 31 extend essentially parallel to the center axis 11 of the connecting point 1, and thus parallel to the center axis of the first tool part 3.

The actuating element 31 is coupled to the locking element 27 in such a way that when the actuating element is displaced in the direction of its center axis 33 tensile or pressure forces are exerted on the locking element 27, so that the locking element is moved in the direction of the center axis 11 by pressure forces and is moved in the opposite direction by tensile forces.

The conversion of the motion of the actuating element 31 to a displacement of the locking element 27 is achieved by means of a coupling device 35. In the exemplary embodiment illustrated here, the actuating element 31 has a slot 37 extending at an acute angle relative to the center axis 33 of the actuating element 31, and thus has two support surfaces, namely, an upper support surface 39 and a lower support surface 41. These support surfaces likewise extend at an acute angle relative to the center axis 33 of the actuating element 31, and thus also at an acute angle relative to the direction of motion thereof. The two support surfaces 39 and 41 are preferably situated essentially parallel to one another, as illustrated here.

A pin 43 extending perpendicular to the image plane of FIG. 1 engages in the slot 37; the diameter of the pin is adapted to the width of the slot 37 so that the pin is able to make contact at the upper support surface 39 and the lower support surface 41. The diameter of the pin 43 is preferably selected so that the pin is guided in the slot 37 essentially without play. The pin 43 is fixedly connected to the locking element 27.

The actuating element 31 is acted on by a pretensioning force which pushes the actuating element into its first functional position, namely, to the left. The pretensioning force is provided by a spring element 45, which in this case is designed as a helical spring. This spring encloses a pin-shaped tapered region 46 of the actuating element 31 and on one side is supported on same, and on the other side is supported at the base of a borehole 47 which accommodates the actuating element 31 and the spring element 45.

The path of motion of the actuating element 31 is limited by a stop so that the actuating element cannot slide to the left out of the borehole 47. In the present case this stop is formed by a screw 49 which engages in a groove, extending in the direction of the center axis 33, in the outer surface of the pin-shaped tapered region 46.

The pretensioning force exerted on the actuating element 31 is transmitted via the coupling device 35 to the locking element 27. The actuating element 31 is moved to the left by the spring element 45 until the stop is reached. The lower support surface 41 on which the pin 43 rests pushes the pin upward, thereby displacing the locking element 27 into its locked position in which it is closest to the center axis 11.

The spring element 45 via the coupling device 35 exerts a pressure force on the locking element 27 which pushes same into the recess 29 in the second tool part 5.

On its end facing the center axis 11 the locking element has a stop bevel 51, which in FIG. 1 ascends from left to right in the direction of the center axis 11. When the second tool part 5 is inserted into the first tool part 3, the shaft 9 is able to push the locking element 27 against the pretensioning force of the spring element 45. When the second tool part 5 is inserted far enough into the first tool part 3, the elastic force causes the locking element 27 to snap into the recess 29.

When the second tool part 5 is inserted, a force is exerted on the locking element 27 from above so that the locking element is pushed downward away from the center axis 11, and the pin 43 presses against the lower support surface 41 of the slot 37 so that the actuating element 31 is displaced against the pretensioning force of the spring element 45 (to the right in FIG. 1).

In order to separate the two tool parts 3 and 5 of the connecting point 1, a pressure force acting from left to right is exerted on the externally accessible actuating element 31, causing the actuating element to be displaced to the right against the pretensioning force of the spring element 45. In this case, the upper support surface 39 acts on the pin 43 which extends in the slot 37, perpendicular to the image plane. Since the slot 37 ascends from left to right, this causes the upper support surface 39 to push the pin 43 downward in this displacement direction of the actuating element 31, so that the locking element 27 is likewise pulled downward and exits the recess 29 in the second tool part 5. The tool parts 3 and 5 of the connecting point 1 are unlocked in this manner.

When the actuating element 31 is displaced to the left or right in the direction of the center axis 33, the support surfaces 39 and 41 of the slot 37 act on the pin 43 in such a way that the locking element 29 coupled thereto is acted on by tensile or pressure forces.

As a result of the coupling device 35 it is sufficient when, as illustrated here, a pretensioning force is exerted on the actuating element 31 which presses same into a specified functional position. The pretensioning force is transmitted to the locking element 27. However, a pretensioning force may also be exerted directly on the locking element 27, the force then also acting on the actuating element 31 via the coupling device 35. However, the implementation illustrated here allows a relatively small, compact design of the connecting point 1. Viewed in the axial direction, i.e., in the direction of the center axis 11, there is sufficient space in the first tool part 3 to accommodate the actuating element 31 and the spring element 45 in the borehole 47. In the direction perpendicular to the center axis 11 only a relatively small space is necessary for accommodating the locking element 27.

With reference to the explanations of FIG. 1, it has been assumed that the retaining device 35 is provided close to the annular surface 21 of the first tool part 3. If the shaft 9 of the second tool part 5 should have a design that is longer than that illustrated in FIG. 1, or, as is common in known tools, is provided with an extension, the retaining device could also be provided at a distance from the annular surface 21, and act on the rear end of the shaft 9 or on an extension connected thereto.

It is further noted that more than one of the retaining devices 35 described here may be provided over the periphery of the connecting point 1, in particular for very large and heavy tools.

Figure 2:
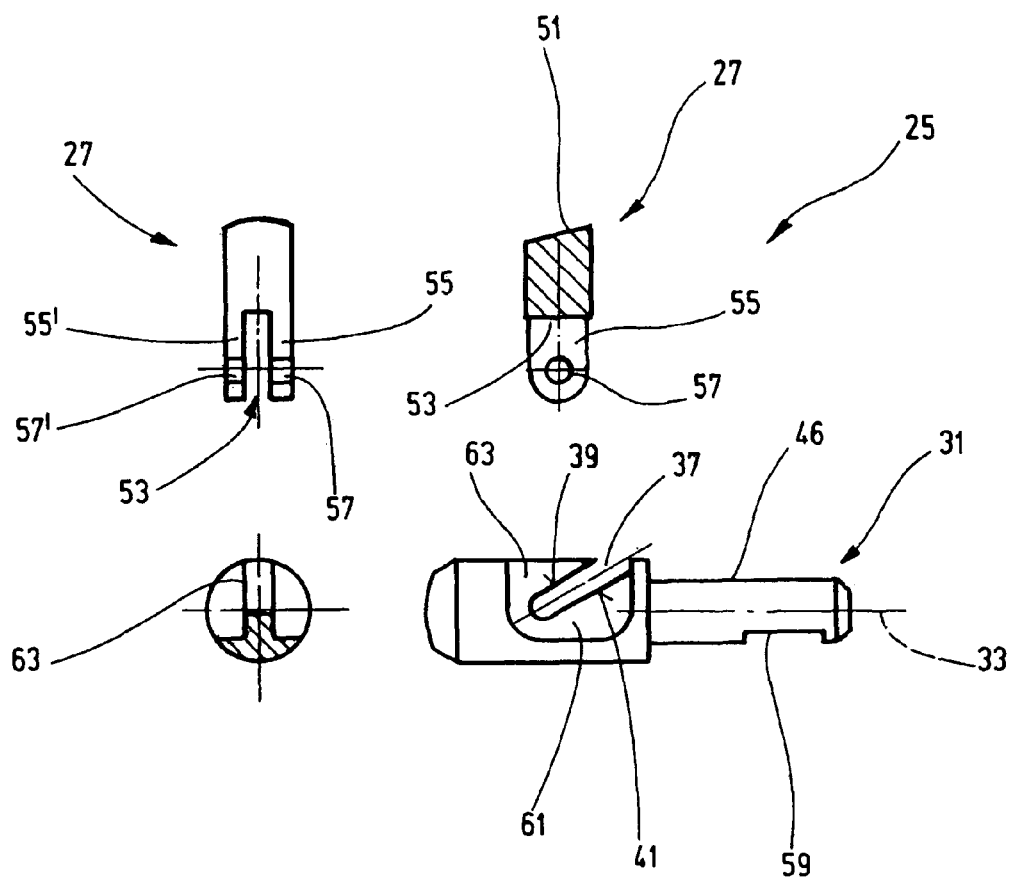
FIG. 2 shows portions of a retaining device for the connecting point according to FIG. 1, in an exploded illustration.

FIG. 2 shows portions of the retaining device 25 in an exploded illustration. Identical parts are provided with the same reference numerals, so that in this regard reference is made to the preceding description.

The top right portion of FIG. 2 illustrates the locking element 27 in the same position as shown in FIG. 1. The stop bevel 51 is clearly shown.

A slot 53 is provided in the end region of the locking element 27 oppositely situated from the stop bevel 51, thereby forming two connecting arms 55, 55' spaced at a distance from one another, of which the connecting arm 55 is illustrated in the top right portion of FIG. 2. The top left portion of FIG. 2 shows the locking element 27 rotated by 90°, thus showing the slot 53 and the other connecting arm 55'.

In the respective end region of the connecting arms 55, 55' facing away from the stop bevel 51a hole 57 or 57' is provided in which the pin 43, explained with reference to FIG. 1 but not illustrated here, is inserted. This pin may be fastened in any given manner.

The lower right portion of FIG. 2 illustrates the actuating element 31 in the side view. In this case the actuating element is situated in the same manner as in FIG. 1. The actuating element has a pin-shaped region 46 having a groove 59, extending in the direction of the center axis 33 of the actuating element 31, in which the screw 49 explained with reference to FIG. 1 engages. This screw basically does not hinder the motion of the actuating element 31. The actuating element 31 may be freely moved back and forth in the borehole 47. However, the path of motion is limited by the fact that the right flank of the groove 59 in FIG. 2 abuts against the screw 49, thus preventing the actuating element 31 in FIG. 1 from being arbitrarily displaced far to the left.

The slot 37 in the actuating element 31 is clearly shown in the lower right portion of FIG. 2. The slot is provided in a region 61 in which the actuating element 31 has a thinner design. At this location a wall region 63, for example, may be provided which is perpendicular to the center axis 33 and which is so thin that it is able to engage in the slot 53 in the locking element 27. In the assembled state, the connecting arms 55 and 55' of the locking element 27 are thus situated on opposite sides of the wall region 63.

FIG. 2 clearly shows that the slot 37 has an upper support surface 39 and a lower support surface 41 which extend essentially in parallel to one another, and at an acute angle relative to the center axis 33 and thus relative to the path of motion of the actuating element 31.

The lower left portion of FIG. 2 shows a cross section of the actuating element 31 which is guided through the region 61. Clearly shown here is the wall region 63, which is able to engage in the slot 53 in the locking element 27 illustrated in the top left portion of the figure. The thickness of the wall region 63 is selected such that relative motion between the locking element 23 and the actuating element 31 may be achieved with the least possible friction. The actuating element 31 moves back and forth, as explained with reference to FIG. 1, in the direction of the center axis 33, whereas on account of the coupling device 35 the locking element 27 undergoes a motion perpendicular to the center axis 33 or to the center axis 11 of the connecting point 1. From the interaction of the parts of the coupling device 35 it is apparent that the locking element 27 may be positioned not only perpendicular to the center axis 11, but also at an angle thereto. As a result of the pin 43 in the slot 37, motion of the actuating element 31 in the direction of the center axis always causes displacement of the locking element 27 relative to the center axis 11.

Figure 3:
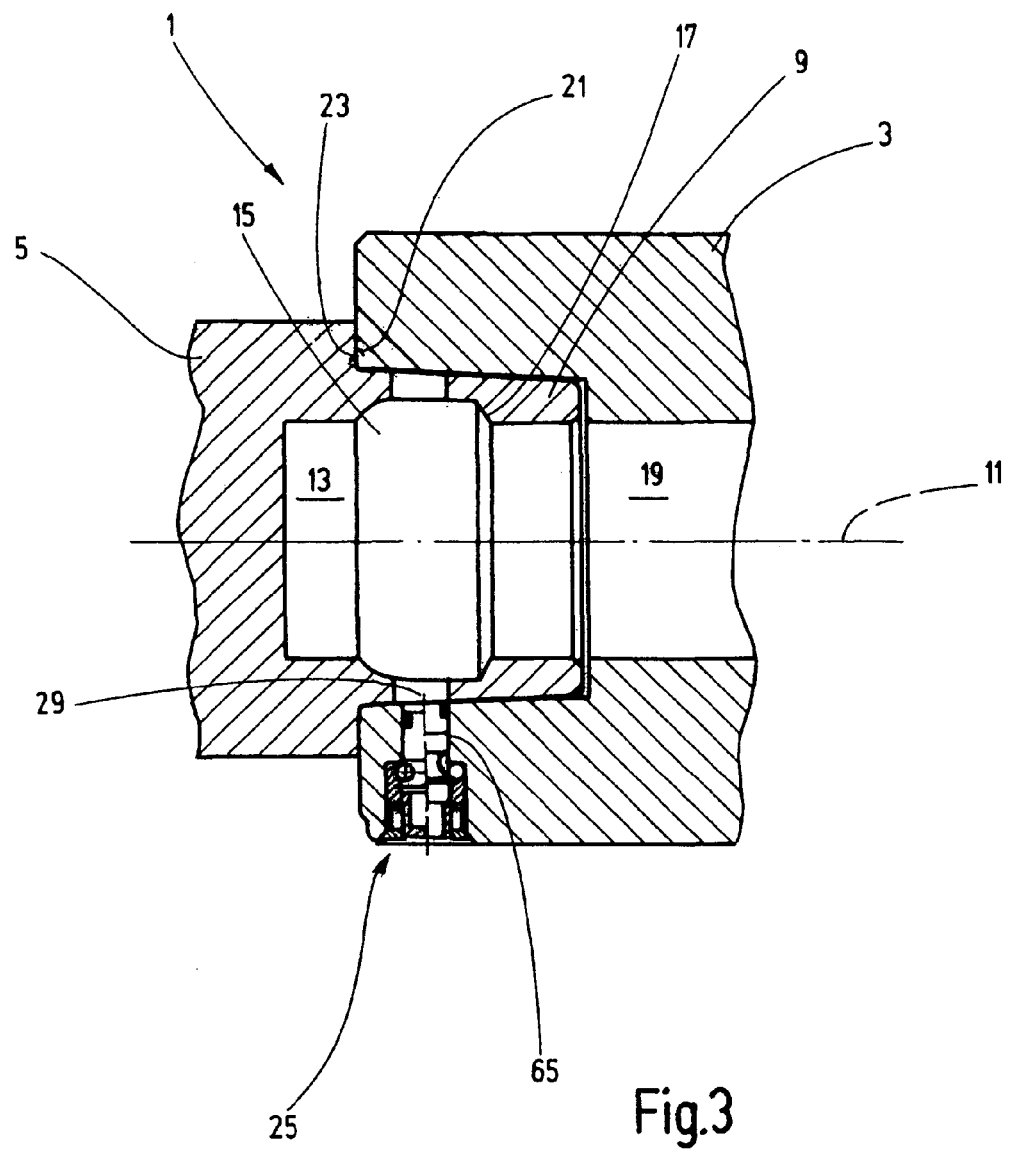
FIG. 3 shows a second exemplary embodiment of a connecting point in the longitudinal section.

FIG. 3 shows a second exemplary embodiment of the connecting point 1, comprising a first tool part 3 and a second tool part 5. Identical parts are provided with the same reference numerals, so that in this regard reference is made to the description for FIG. 1 in order to avoid repetition.

The two exemplary embodiments according to FIGS. 1 and 3 differ in that FIG. 3 illustrates a modified retaining device 25 in a partial sectional view. The retaining device has a symmetrical design. The retaining device 25 to the right of a line of symmetry 65 is in the locked state, and to the left is in the unlocked state.

In this exemplary embodiment as well, one or more retaining devices 25 may be provided, depending on the size and/or weight of the tool parts.

Figure 4:
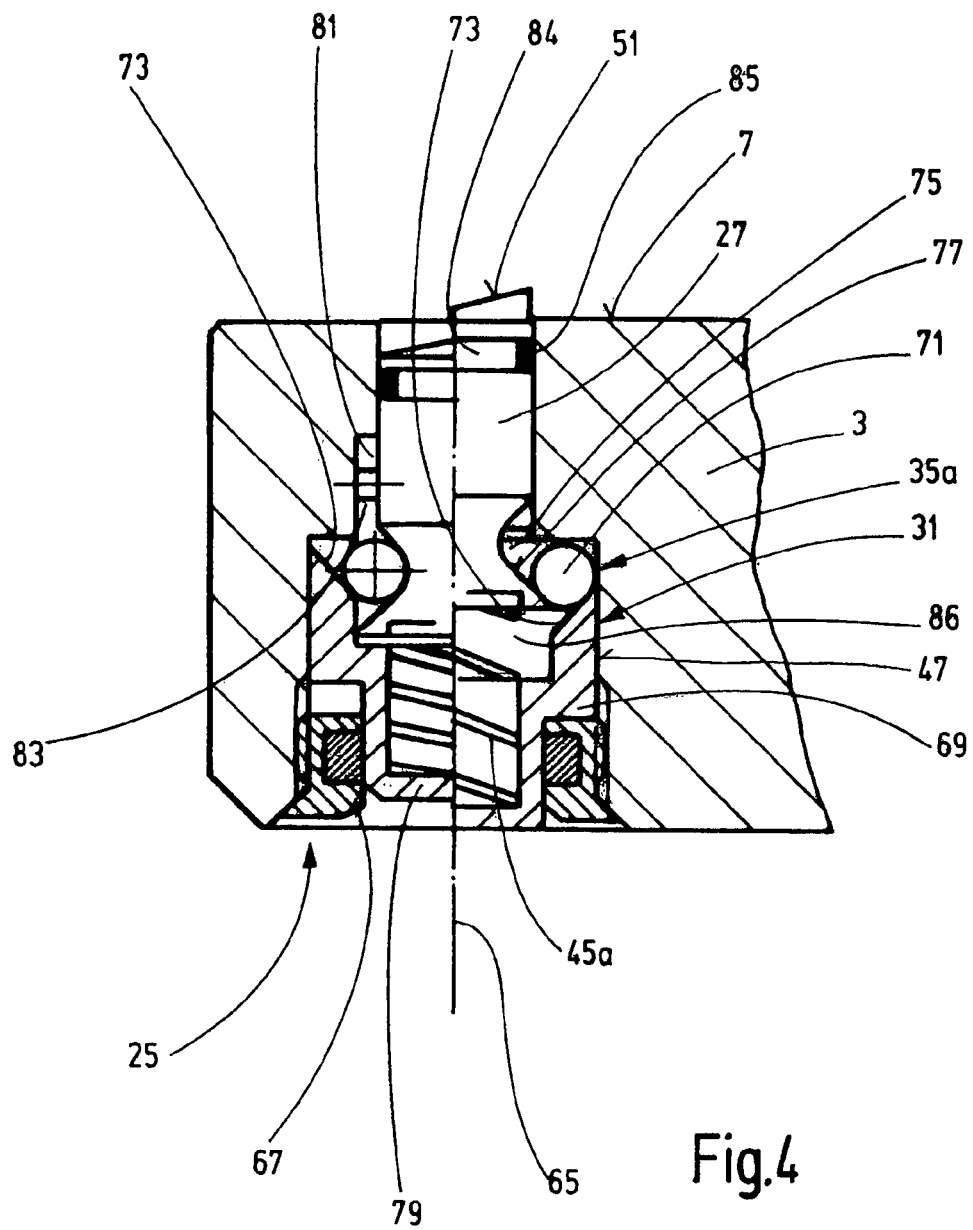
FIG. 4 shows an enlarged section of a retaining device for the connecting point according to FIG. 3.

A more detailed description of the retaining device 25 is provided with reference to FIG. 4, which illustrates the retaining device in a greatly enlarged view. The following discussion relates to the illustration on the right side of the line of symmetry 65, showing the retaining device 25 in the locked state.

The retaining device 25 has a locking element 27 with a stop bevel 51, which in this case projects beyond the inner surface of the recess 7 in the first tool part 3. The locking element 27 thus engages in a second tool part 5 (not illustrated here) of the connecting point 1, as has been explained with reference to FIG. 1.

The locking element 27, the same as for the first exemplary embodiment, may be displaced back and forth, i.e., up and down in FIG. 4, perpendicular to a center axis 11 (not illustrated here) of the connecting point 1. The locking element may also extend at an angle relative to the center axis 11.

The retaining device 25 has an actuating element 31 which, in a departure from the first exemplary embodiment, may likewise be displaced perpendicularly or at an angle to a center axis 11 (not illustrated here) of the connecting point 1, i.e., up and down in the illustration according to FIG. 4. On the right side of the line of symmetry 65 the actuating element 31 is in a lower, first functional position in which, on account of a pretensioning force exerted by a spring element 45a, the first locking element 27 is situated in its first maximum upwardly displaced position. In this functional position the actuating element 31 rests against a stop 67, thus preventing it from falling out or being pushed downward from a borehole 47 in the first tool part 3 in which the actuating element 31 and the locking element 27 are accommodated together with the spring element 45a.

In the present case the stop 67 is implemented by an eye bolt, which with an outer thread engages with an inner thread provided on the inner surface of the borehole 47. The stop may thus be upwardly displaced relative to the line of symmetry 65 in the direction of the center axis 11 of the connecting point 1, or in the opposite direction.

The actuating element 31 has an essentially cylindrical base body 69 which has a hollow design so that it is able to accommodate the spring element 45a. The floor of the base body forms a support surface for the spring element 45a, which in this case as well is designed as a helical spring and which is also supported at the underside of the locking element 27, i.e., on the end of the locking element 27 oppositely situated from the stop bevel 51. This causes the locking element 27 to be pushed upward into its locked position to the right of the line of symmetry 65.

FIG. 4 shows a coupling device 35a which is used to convert an upward motion of the actuating element 31 in the direction of the line of symmetry 65 into tensile forces which pull the locking element 27 downward against the pretensioning force of the spring element 45a.

Pressure forces acting from above on the locking element 27 are thus exerted solely by the spring element 45a. In this case the actuating element 31 when moved upward exerts tensile forces on the locking element 27 solely via the coupling device 35, whereas in the first exemplary embodiment the actuating element 31 is able to produce tensile and pressure forces via the coupling device 35.

The coupling device 35a has at least one ball 71. In the present case a number of balls are provided over the peripheral surface of the borehole 47. At least three such balls are preferably present, which are held in equal circumferential spacing in order to achieve uniform production of force on the locking element 27. However, a coupling device 35a having a plurality of balls 71 is preferred.

On its upper edge the actuating element 31 has an actuating surface 73 which extends upward conically as viewed from the line of symmetry 65. The at least one ball 71 contacts this actuating surface.

The locking element 27 has an indentation 75 which is provided in the lower end region of the locking element 27, in the peripheral surface thereof, facing away from the stop bevel 51, the peripheral surface having an actuating surface 77 extending in the opposite direction from the actuating surface 73 and tapering upwardly from the lower end of the locking element 27, i.e., extending conically in the direction of the line of symmetry 65.

The mode of operation of the coupling device 35a is as follows:

When the actuating element 31 is moved upward against the force of the spring element 45 in the direction of the line of symmetry 65, which is illustrated on the left side of the line of symmetry 65, the actuating surface 73 of the actuating element 31 presses the ball 71 inwardly in the direction of the line of symmetry 65, which also represents the center axis of the borehole 47. The actuating element is therefore designed, in a manner of speaking, as a wedge drive between the actuating surface 37 [sic; 73] and the at least one ball 71.

The inwardly directed forces from the ball 71 act on the actuating surface 77 of the locking element 27 in such a way that when the at least one ball 71 moves inwardly, tensile forces are exerted on the locking element 27 which move the locking element downward, i.e, away from the centerline 11, i.e., in the direction of the line of symmetry 65.

On the left side of the line of symmetry 65, FIG. 4 shows that the upward motion of the actuating element 31 and the effect of the coupling device 35a result in a downward motion of the locking element 27.

In the exemplary embodiment illustrated here, the actuating element 31 has a cylindrical shoulder 79 which projects through the open interior space of the stop 67 which is designed as an eye bolt, and is therefore externally accessible by an operator. As described here, the operator is thus able to press the actuating element 31 upwardly against the force of the spring element 45a, which is illustrated on the left side of the line of symmetry 65 in FIG. 4.

The two connecting arms 55 and 55' of the locking element 27 described with reference to FIG. 1 grip the wall region 63 of the actuating element 31. This design prevents rotation of the locking element 27, thus ensuring that the stop bevel 51 is always oriented in such a way that the locking element 27 can be pushed back against the pretensioning force when a second tool part 5 is inserted into the first tool part 3.

The exemplary embodiment of the retaining device 25 illustrated in FIGS. 3 and 4 likewise suitably ensures that the locking element 27 is prevented from rotating and that the stop bevel 51 is oriented as intended. Rotation could be prevented, for example, by a polygonal design of the locking element 27. In that case, however, a polygonal channel would have to be provided in this region of the borehole 47. In the exemplary embodiment illustrated here, a groove 81 is provided on the interior of the borehole 47 in which a projection 83, implemented as a pin or screw, for example, engages, and which protrudes from the outer wall of the locking element 27.

A suitable channel and/or seal is preferably provided in the contact region between the locking element 27 and the first tool part 3, for example a seal 85, preferably designed as an O-ring, inserted into a groove 85 in the locking element 27.

A corresponding device such as an O-ring or the like is preferably provided in the contact region between the cylindrical shoulder 79 of the actuating element 31 and the inner surface of the stop 67.

Figure 5:
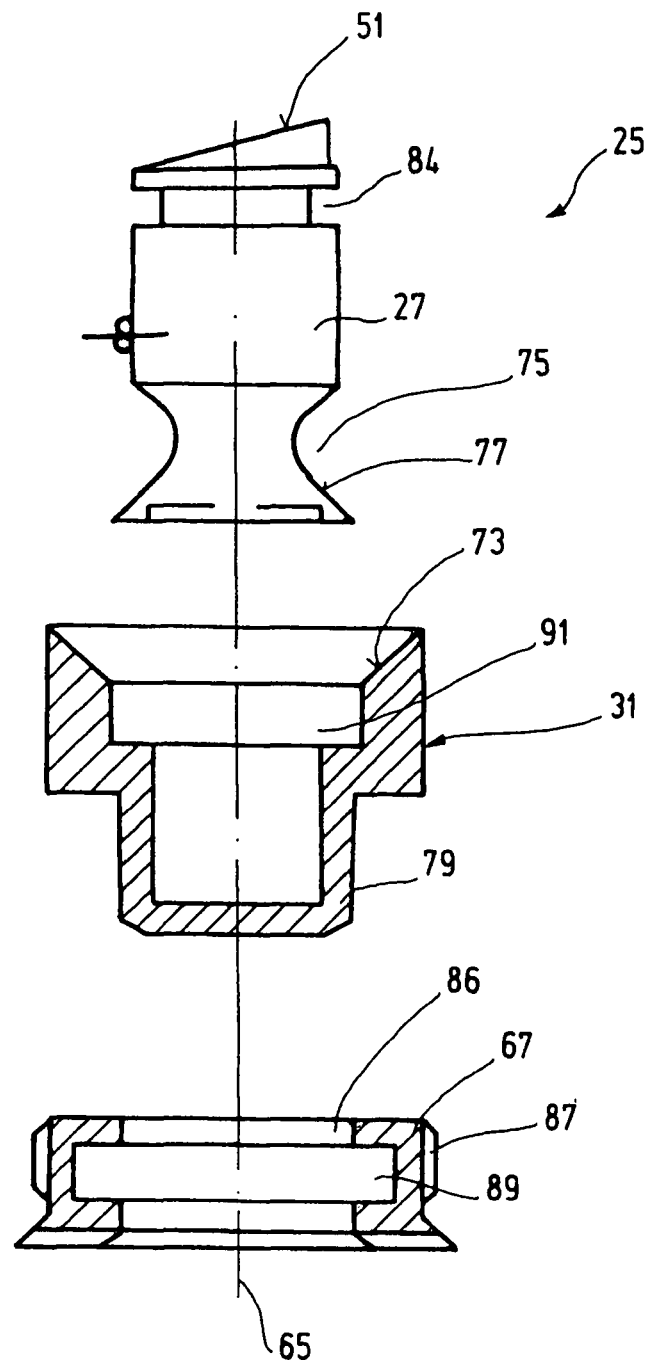
FIG. 5 shows portions of the retaining device according to FIGS. 3 and 4, in an exploded illustration.

FIG. 5 shows portions of the retaining device 25 as represented in FIG. 4, in an exploded illustration. The bottom portion of the figure shows the annular stop 67, which comprises an open interior 86, an outer thread 87, and a circumferential groove 89 in the inner wall of the interior 86 for accommodating a seal (not illustrated here).

The actuating element 31 is situated above the stop 67, concentric with the center axis of the retaining device 25 which coincides with the line of symmetry 65; the cylindrical shoulder 79 of the actuating element is designed so that it engages in the interior 86 with the least possible friction.

Shown above the actuating element 31 is the actuating surface 73 thereof, which opens conically upward and cooperates with the at least one ball 71 (not illustrated here) of the coupling device 35a described in FIG. 4.

Aligned concentrically with the actuating element 31 is the locking element 27, which is able to engage in places with the interior 91 of the actuating element 31, which in this case has a capped shape, thereby allowing relative motion in the direction of the line of symmetry 65 between the locking element 27 and the actuating element 31.

The top portion of FIG. 5 shows that an indentation 75 having an actuating surface 77 is provided in the peripheral surface of the locking element 27. This actuating surface tapers upward conically in the direction of the line of symmetry 65.

The stop bevel 51 is shown at the top of the locking element 27. The groove 84 is also clearly shown.

From the explanations of FIGS. 3 through 5 it is apparent that the retaining device 25 acts automatically in this case as well. When two tool parts 3 and 5 are joined one inside the other in the region of a connecting point 1, the locking element 27 is first pushed back, but on account of a pretensioning force exerted by a spring element 45a is then pushed into a functional position referred to as the locked position. In this position the locking element 27 engages in a recess 29 in the second tool part 5 which may be designed as a borehole, annular groove, or, as described above, as any given depression in the outer surface of a portion of the second tool part 5.

The two tool parts 3 and 5 of the connecting point 1 are thus held together by the retaining device 25, without actuating a clamping device which is activated for ultimately joining the two tool parts 3 and 5, whether by manual or mechanical means, in particular automatically.

An operator is thus able to manually join the two tool parts, and as a result of the automatic action of the retaining device 25 the two joined tool parts no longer have to be held. The operator thus has both hands free in order to actuate the clamping device and secure himself, i.e., hold himself stationary during the procedure.

The two exemplary embodiments show that the locking element 27 may be displaced perpendicular to the center axis 11 but also at an angle thereto, and that an actuating element 31 which cooperates with the locking element 27 via a coupling device 35, 35a may be displaced essentially parallel to the center axis 11 or perpendicular thereto in order to exert a tensile and/or pressure force on the locking element 27.

In both cases the retaining device 25 has a very simple design and is therefore unsusceptible to malfunction, and is also easy to handle. Manual locking is omitted since the retaining device 25 acts automatically. To unlock the retaining device 25 it is necessary only to exert a pressure force on the actuating element 31. In this case the clamping device is already loosened, so that the operator is able to grip and unlock the tool parts 3 and 5 anyway due to the pressure force which is exerted on the actuating element 31.

From the above discussions it is clear that the retaining device 25 may be provided in conjunction with many different types of connecting points 1. In particular, it is irrelevant whether the shaft 9 of the second tool part and the corresponding recess 7 in the first tool part 3 have a cylindrical, polygonal, and/or conical shape.

Depending on the length of the shaft 9, the retaining device may also be situated at a greater or smaller distance from the front side of the first tool part 3, i.e., from the annular surface 21 thereof. The design of the connecting point 1 may thus be varied over a broad range.

The retaining device described here may also be provided with one or more locking elements 27 distributed over the peripheral surface of the connecting point 1, or even multiple retaining devices 25.

In principle it is possible to combine the exemplary embodiments, as described with reference to the figures, with one another.

The connecting point 1 described here is very unsusceptible to malfunction because a simple coupling is possible between the locking element 27 and actuating element 31 via the coupling device 35 or 35a described here, and tensile and/or pressure forces may be easily exerted on the locking element 27.

The stop 67 described in conjunction with FIGS. 3, 4, and 5 may also be provided in the exemplary embodiment according to FIG. 1. For example, an element, such as an annular adjusting screw, which is displaceable in the longitudinal direction of the center axis 33 of the borehole may be inserted into the borehole 47, and is screwed a longer or shorter distance into the borehole to form a displaceable abutment for the spring element 45.

In principle, in the exemplary embodiment according to FIG. 1 a stop may also be provided at the end of the borehole 47 at which the actuating element 31 may be inserted. For example, an eye bolt may also be provided here which prevents the actuating element 31 from falling out of or being pushed through the borehole 47.

The invention claimed is:

1. A connection connecting two tool parts, the connection comprising:
    a first tool part having a receptacle receiving a second tool part;
    a clamping device clamping the tool parts together in a joined state; and
    a retaining device for holding the first and second tool parts together in the joined state, the retaining device having an actuating element and at least one locking element operative in a locked position to engage the other of the first and second tool parts when the first and second tool parts are joined and thereby hold the first and second tool parts together, the locking element displaceably supported in one of the first and second tool parts, the actuating element slidably supported in one of the first and second tool parts, the actuating element cooperating with the locking element such that the actuating element exerts forces on the locking element, the actuating element being linearly slidable into a first functional position in which the actuating element pushes the locking element into the locked position, the locking element being acted on by a pretensioning force in the locked position which pushes the locking element into the locked position, the actuating element operative to urge the locking element into the unlocked position in response to being pressed by an operator.

2. The connection according to claim 1, wherein the retaining device is automatically actuated when the first and second tool parts are joined.

3. The connection according to claim 1, wherein the locking element and the actuating element are coupled such that, as a result of forces acting on the actuating element, the locking element is displaced into an unlocked position in which the first and second tool parts may be separated.

4. The connection according to claim 1, wherein the actuating element is braced by a pretensioning force which pushes the actuating element into the first functional position.

5. The connection according to claim 1, further comprising a spring element for producing the pretensioning force.

6. The connection according to claim 1, wherein the locking element is disposed at an angle of approximately ≦90° relative to a center axis of the connection.

7. The connection according to claim 1, wherein the actuating element is disposed at an angle of approximately 0° to approximately 90° relative to a center axis of the connection.

8. The connection according to claim 1, wherein the actuating element has at least one surface which is situated at an angle relative to the direction of motion of the actuating element for cooperating with the locking element, the at least one surface selected from a group consisting of an actuating surface and a support surface.

9. The connection according to claim 8, wherein the at least one surface cooperates with the locking element through a coupling device.

10. The connection according to claim 8, wherein the actuating element has two support surfaces at an angle relative to the direction of motion of the actuating element, the two support surfaces cooperating with the locking element.

11. The connection according to claim 10, wherein the support surfaces extend generally parallel to one another.

12. The connection according to claim 1, wherein the locking element has at least one actuating surface situated at an angle relative to the direction of motion of the locking element and cooperating with the actuating element.

13. The connection according to claim 12, wherein the locking element cooperates with the actuating element through a coupling device.

14. The connection according to claim 13, wherein the coupling device has at least one ball.

15. The connection according to claim 1, wherein the retaining device has at least one adjustment element.

16. The connection according to claim 15, wherein the adjustment element acts as a stop for at least one of the locking element and actuating element.

17. The connection according to claim 15, wherein the adjustment element adjusts a pretensioning force action on at least one of the locking element and the actuating element.

18. The connection according to claim 1, wherein the locking element engages in a recess defined in the second tool part.

19. The connection according to claim 1, wherein the locking element has a stop bevel.

20. The connection according to claim 1, wherein the locking element and/or actuating element is precluded from rotation.

21. The connection according to claim 1, wherein the actuating element is precluded from rotation.

22. The connection according to claim 1, wherein the receptacle in the first tool part has a recess which accommodates the second tool part.

23. The connection according to claim 22, wherein the recess is cylindrical or conical.

24. The connection according to claim 22, wherein the recess is polygonal.

25. The connection according to claim 22, wherein a region of the second tool part inserted in the recess is designed as a shaft, an outer contour of the shaft having a shape complementary to an inner contour of the recess in the first tool part.

26. The connection according to claim 1, wherein a displacement path of the actuating element is parallel to a center axis of the first tool part.

27. A connection connecting two tool parts, the connection comprising:
a first tool part having a receptacle for receiving a second tool part;
a clamping device for clamping the first and second tool parts together in a joined state; and
a retaining device independent of the clamping device and for holding the tool parts together in the joined state, the retaining device having at least one locking element displaceably supported in one of the tool parts, the locking element operative in a locked position to engage the other tool part when the first and second tool parts are joined, thereby holding the first and second tool parts together, the retaining device having an actuating element slidably supported in one of the tool parts that cooperates with the locking element in such a way that the actuating element exerts forces onto the locking element, the actuating element being linearly slidable into a first functional position in which the locking element is urged into the locked position, the locking element displaceable into an unlocked position in which the first and second tool parts may be separated as a result of forces acting on the actuating element, the locking element being acted on by a pretensioning force in the locked position which pushes the locking element into the locked position, the actuating element operative to urge the locking element into the unlocked position in response to being pressed by an operator.

28. The connection according to claim 27, wherein a displacement path of the actuating element is at least substantially parallel to a center axis of the first tool part.

29. A connection connecting two tool parts, the connection comprising:
a first tool part having a receptacle extending along a central axis for receiving a second tool part;
a clamping device for clamping the first and second tool parts together in a joined state; and
a retaining device independent of the clamping device and for holding the first and second tool parts together in the joined state, the retaining device having a locking element supported by the first tool part, the locking element operative in a locked position to engage the second tool part when the first and second tool parts are joined, thereby holding the first and second tool parts together, the retaining device having an actuating element supported by the first tool part for movement along an axis parallel to the central axis, the actuating element cooperating with the locking element in such a way that the actuating element exerts forces onto the locking element, the actuating element being linearly slidable into a first functional position in which the locking element is urged into the locked position, the locking element displaceable into an unlocked position in which the first and second tool parts may be separated as a result of forces acting on the actuating element, the locking element being acted on by a pretensioning force in the locked position which pushes the locking element into the locked position, the actuating element operative to urge the locking element into the unlocked position in response to being pressed by an operator.

* * * * *